(12) United States Patent
Naim et al.

(10) Patent No.: US 9,705,660 B1
(45) Date of Patent: *Jul. 11, 2017

(54) AGGREGATING SPECTRUM CHUNKS FOR MAXIMUM BANDWIDTH UTILIZATION

(71) Applicant: Sprint Communications Company L.P., Overland Park, KS (US)

(72) Inventors: Muhammad Ahsan Naim, Sterling, VA (US); Shahzada Basharat Rasool, Vienna, VA (US); Yu Zhou, Herndon, VA (US); Daniel Alberto Vivanco, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 324 days.

This patent is subject to a terminal disclaimer.

(21) Appl. No.: 14/554,446

(22) Filed: Nov. 26, 2014

Related U.S. Application Data

(63) Continuation of application No. 13/768,380, filed on Feb. 15, 2013, now Pat. No. 8,934,918.

(51) Int. Cl.
*H04L 5/00* (2006.01)
*H04W 72/04* (2009.01)
*H04W 28/20* (2009.01)

(52) U.S. Cl.
CPC .......... *H04L 5/0098* (2013.01); *H04L 5/0041* (2013.01); *H04L 5/0046* (2013.01); *H04W 72/04* (2013.01); *H04W 72/0493* (2013.01); *H04W 28/20* (2013.01)

(58) Field of Classification Search
CPC . H04W 28/02; H04W 72/04; H04W 72/0453; H04W 72/0493; H04W 72/12; H04W 72/1257; H04W 72/1263; H04W 28/20; H04L 5/0001; H04L 5/001; H04L 5/0028; H04L 5/0033; H04L 5/0037–5/0042; H04L 5/0064; H04L 5/0091–5/0098; H04L 5/0041; H04L 5/0046
See application file for complete search history.

(56) References Cited

U.S. PATENT DOCUMENTS

| | | | |
|---|---|---|---|
| 8,934,918 B1* | 1/2015 | Naim | H04W 16/00 370/395.41 |
| 2011/0199999 A1* | 8/2011 | Nakao | H04L 5/003 370/329 |
| 2012/0014330 A1* | 1/2012 | Damnjanovic | H04L 5/001 370/329 |

* cited by examiner

Primary Examiner — Joshua Kading

(57) ABSTRACT

The invention is directed to methods and systems for maximizing bandwidth utilization. Once a mobile device has attempted to communicate data through an LTE-based wireless communications network, a carrier bandwidth of a carrier is determined. A standard cell structure is then selected based on the carrier bandwidth such that the standard cell structure is capable of operating at a larger bandwidth than the carrier bandwidth. One or more resource blocks are identified that are not needed to communicate data to and from the mobile device. These resource blocks are zero padded. An identification of these unused resource blocks is communicated to the master information block, which broadcasts this information to the mobile device.

18 Claims, 5 Drawing Sheets

US 9,705,660 B1

AGGREGATING SPECTRUM CHUNKS FOR MAXIMUM BANDWIDTH UTILIZATION

CROSS-REFERENCE TO RELATED APPLICATIONS

This application is a continuation of U.S. patent application Ser. No. 13/768,380, filed on Feb. 15, 2013 and titled "AGGREGATING SPECTRUM CHUNKS FOR MAXIMUM BANDWIDTH UTILIZATION," the disclosure of which is incorporated by reference herein in its entirety.

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, utilizing non-standard spectrum chunks that, in some embodiments, are noncontiguous. For example, a standard cell structure (e.g., a template that provides a bandwidth supported by a particular wireless communications standard) is selected that is larger than a carrier bandwidth (e.g., bandwidth supported by a particular carrier) such that one or more portions of the standard cell structure are effectively shut down so as to reduce the bandwidth of the standard cell structure to closer to the bandwidth of the spectrum supported by a particular carrier. In one embodiment, portions of the standard cell structure, such as resource blocks, are zero padded, indicating that these portions will not be used in the communication of data to and from the mobile device for a particular communications session. The portions of standard cell structure that are not zero padded, meaning that they are used in the communication of data to and from the mobile device for a particular communication session, are noncontiguous, in one embodiment.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
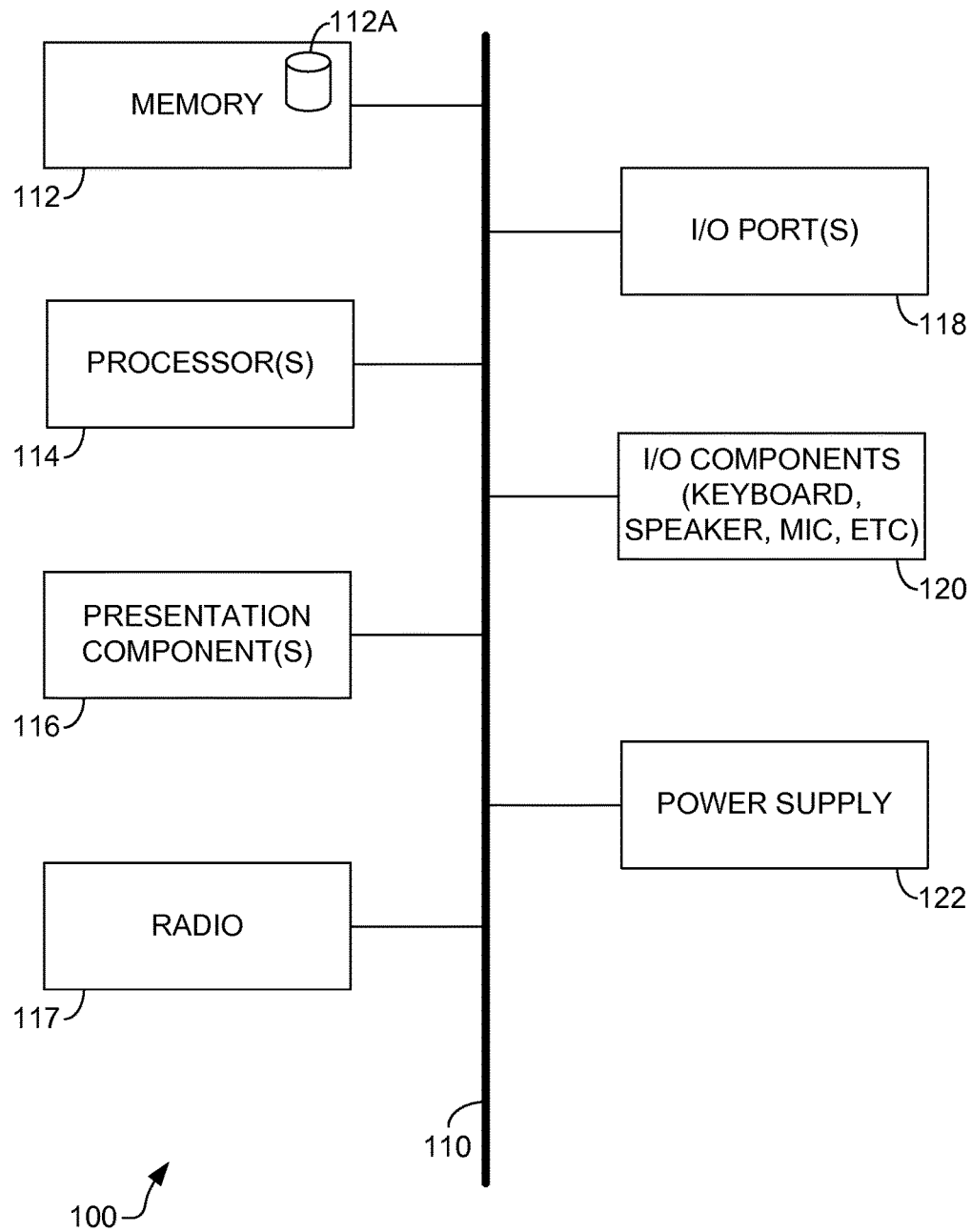
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CDMA Code Division Multiple Access
    EPC Evolved Packet Core
    FDD Frequency Division Duplexing
    GGSN GPRS Gateway Support Node
    GPRS General Packet Radio Service
    GSM Global System for Mobile communications (Groupe Spécial Mobile)
    HTTP Hypertext Transfer Protocol
    IP Internet Protocol
    LED Light Emitting Diode
    LTE Long-Term Evolution
    OFDM Orthogonal Frequency Division Multiplex
    PDA Personal Data Assistant
    PDSN Packet Data Serving Node
    RNC Radio Network Controller
    SAE System Architecture Evolution
    TDD Time Division Duplexing
    TDMA Time Division Multiple Access
    UMTS Universal Mobile Telecommunications System Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward methods for maximizing bandwidth utilization. For instance, instead of using one or more standard cell structures (e.g., utilizing a 1.4 MHz and a 5 MHz standard cell structure for a 7 MHz carrier bandwidth) in an attempt to match or at least come close to the carrier bandwidth, one larger standard cell structure may be selected. Because the standard cell structure in this embodiment is larger than the carrier bandwidth, one or more resource blocks of the standard cell structure may not be used to communicate data. In one embodiment, this is done by zero padding the resource elements that comprise the one or more resource blocks that will not be used to communicate data. In zero padding these resource blocks, the larger standard cell structure may be reduced to a bandwidth that is equal or substantially similar to the carrier bandwidth. As such, if a 10 MHz standard cell structure is selected for a particular communications session of a mobile device, if the carrier bandwidth is 7 MHz, enough resource blocks to reduce the standard cell structure to about 7 MHz, more or less, are zero padded. While resource blocks are referred to herein as being zero padded, it is the individual resource elements that comprise the resource blocks that are actually zero padded.

In a first aspect of the present invention, a computerized method carried out by at least one server having one or more processors is provided for performing a method of maximizing bandwidth utilization in a wireless communications network. The method includes determining a carrier bandwidth of a carrier associated with a mobile device that is attempting to communicate data by way of the wireless communications network, and based on the carrier bandwidth, selecting a standard cell structure that allows the mobile device to send and receive the data at a bandwidth substantially similar to the carrier bandwidth. The method further includes identifying one or more portions of the standard cell structure that will not be used to transmit the data associated with the communication of the data, and prior to communicating the data, inputting zeroes into the one or more portions of the standard cell structure that will not be used to transmit the data.

In a second aspect of the present invention, a system is provided for maximizing bandwidth utilization in a wireless communications network. The system includes a base station in a wireless communications network adapted to determine a potential bandwidth available to a carrier associated with a mobile device requesting data, select a standard cell structure that is larger than the potential bandwidth available to the carrier, and determine how much bandwidth of the selected standard cell structure that will not be used to communicate the data. The base station is further adapted to identify a first set of resource blocks that will not be used to communicate the data, identify a second set of resource blocks that will be used to communicate the data, and input zeroes into the first set of resource blocks that will not be used to communicate the data.

In a third aspect of the present invention, a computer-implemented method of maximizing bandwidth utilization in a wireless communications network is provided. The method includes receiving an indication that a mobile device is attempting to communicate data by way of a wireless communications network, and determining an operator bandwidth corresponding to a carrier that is associated with the mobile device. Further, the method includes, based on the operator bandwidth, selecting a standard cell structure that has a potential to operate at a bandwidth larger than the operator bandwidth to maximize bandwidth utilization of the carrier, and at a base station, identifying one or more resource blocks of the standard cell structure that will not be used to transmit the data associated with the communication of the data. Additionally, the method includes, prior to communicating the data by way of the standard cell structure, inputting zeroes into the one or more resource blocks of the standard cell structure that will not be used to transmit the data.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Component 112A may be an application or code that is stored on device 100 that carries out one or more processes, as described herein. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
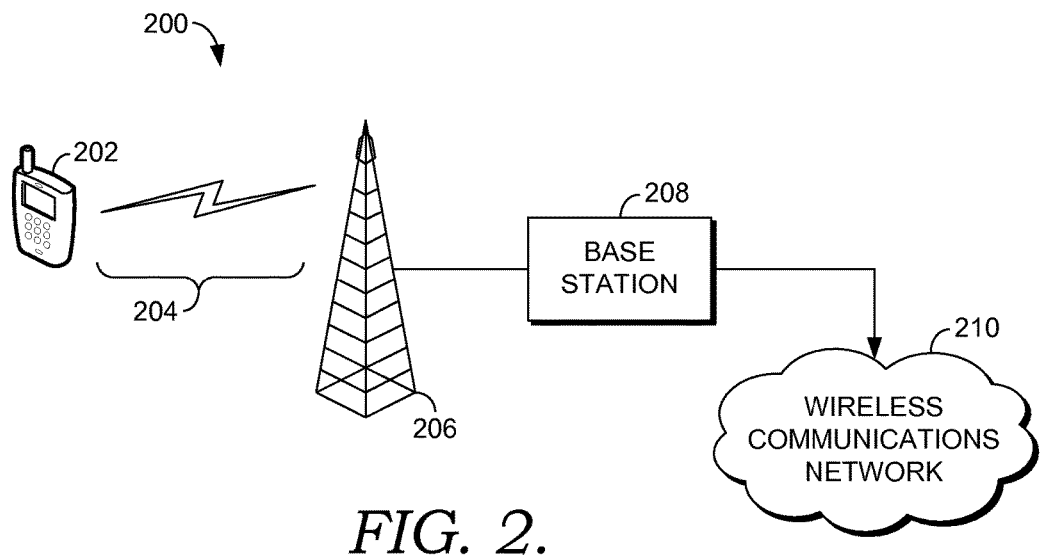
FIG. 2 depicts an illustrative operating system for carrying out embodiments of the present invention.

FIG. 2 depicts an illustrative operating environment, referenced generally by the numeral 200, and illustrates an illustrative networking environment that enables communication of data between a mobile device and a wireless communications network. The illustrative operating environment 200 shown in FIG. 2 is merely an example of one suitable operating environment and is not intended to suggest any limitation as to the scope of use or functionality of embodiments of the present invention. Neither should the operating environment 200 be interpreted as having any dependency or requirement related to any single module/component or combination of modules/components illustrated therein.

Mobile device 202, in one embodiment, is the type of device described in connection with FIG. 1 herein. The mobile device 202 may support multiple technologies such as CDMA 1×A, GPRS, EvDO, TDMA, GSM, WiMax technology, LTE, LTE Advanced, and the like. Alternatively, the mobile device 202 may support one type of technology, such as LTE (LTE and/or LTE Advanced). Any and all such aspects, and any combination thereof, are contemplated as being within the scope of the invention. The mobile device 202 may include a client application that helps carry out aspects of the technology described herein. The client application may be a resident application on the handset used by the mobile device to communicate data using embodiments of the present invention. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application is utilized by the mobile device to send and receive data through a wireless communications network 210. For instance, the mobile device 202 may wish to download content from a web service. This data may be communicated to the mobile device 202 by way of the wireless communications network 210.

The mobile device 202 may subscribe to services offered by the wireless communications network 210. As such, the mobile device 202 may be in communication with a base station 208 via wireless-telecommunications links such as, for example, wireless-telecommunications link 204, which allows for data to be wirelessly communicated between the mobile device 202 and the cell tower 206. The mobile device 202 may communicate with the base station 208 via the wireless-telecommunications link 204 to facilitate attachment of the mobile device 202 to the base station 208. Once attached, the mobile device 202 may also use the wireless-telecommunications link 204 to send and/or receive voice call information and/or data information as well as information concerning device capabilities. In one aspect, the mobile device 202 may utilize the wireless-telecommunications link 204 to send data session requests to the base station 208.

The base station 208 includes hardware and bandwidth(s) of a specified frequency. Although the term "base station" is used throughout this application, equivalent terms may include radio access node, eNodeB, and Node B. For example, if the wireless communications system utilizes LTE, the base station would be termed eNodeB. The hardware includes, for example, the actual radio mast or tower (shown separately as item 206), as well as antennas, transceivers, GPS receivers, electrical power sources, digital signal processors, control electronics, and the like that are associated with the radio tower. The RF spectrum bandwidth may comprise one or more channels. With respect to this application, the term "channel" refers to an upload spectrum and a download spectrum.

In one embodiment, the base station 208 is responsible for selecting a standard cell structure to be utilized by the mobile device 202 that is initiating a communications session with the wireless communications network. As such, the base station 208 receives a request from the mobile device 202 to initiate a communications session, and based on this request and upon knowing the available bandwidth to the carrier associated with the mobile device 202, may select a standard cell structure when resource scheduling that is suitable for the communications session, in accordance with embodiments of the present invention, as further described herein. The base station 208 may also communicate standard cell structure information to the master information block of the standard cell structure so that the mobile device 202 is eventually aware of which resource blocks will be used in data communication when this information is broadcast by the standard cell structure.

Besides being in communication with the mobile device 202 via the wireless-telecommunications link 204, the base station 208 may be in communication with other base stations (not shown) in the network via additional telecommunications links (not shown) which may be wired or wireless to facilitate handoffs or handovers between the different base stations when the mobile device 202 moves from one base station to the next. The base station 208 may also communicate with the wireless communications network 210 via wired and/or wireless telecommunications links.

As mentioned, embodiments of the present invention allow for data to be communicated to and from the mobile device 202 by way of the wireless communications network 210. Each carrier utilizes a bandwidth that is specific to the technology with which it allows its customers to communicate voice and data. For instance, iDEN bandwidth is 25 KHz, while EVDO bandwidth is 1.25 MHz. As such, the carrier bandwidth may vary based on the carrier itself, and/or based on the technology used. This may create an issue, however, with some communicating technologies that only operate at predefined bandwidths. For example, LTE systems only support bandwidths of 1.4, 3, 5, 10, 15, or 20 MHz. Therefore, if a carrier bandwidth is 7 MHz, for example, a portion of the 7 MHz may not be utilized during data transfer. As bandwidth is one of the most precious resources in wireless communication, operators have a desire to maximize utilization of their spectrum.

Typically, carrier bandwidth is not fully utilized, meaning that the carrier bandwidth is larger than the standard cell structure. This leaves some bandwidth that is not utilized, as will be further described in reference to FIG. 4 below. In order to maximize bandwidth utilization, embodiments of the present invention provide for selecting a standard cell structure that is larger than the carrier bandwidth, instead of selecting a standard cell structure (or more than one standard cell structures) that is smaller than the carrier bandwidth and underutilizing the carrier bandwidth. As used herein, standard cell structure is a spectrum cell or a template for a particular wireless communications standard. For instance, for LTE, the cells are standardized, and are 1.4, 3, 5, 10, 15, or 20 MHz wide. Each of these may be referred to herein as a standard cell structure. Carrier bandwidth, as used herein, refers to the bandwidth available to a particular operator. This may represent the amount of spectrum owned by that particular carrier or operator.

While embodiments of the present invention may be used with different technologies or standards (CDMA 1×A, GPRS, EvDO, TDMA, GSM, WiMax technology, LTE, LTE Advanced), LTE will be described for exemplary purposes. By way of background, LTE is a standard for wireless communication of high-speed data for mobile devices and other data terminals. It is based on the GSM/EDGE and UMTS/HSPA network technologies. The LTE standard was developed by the 3GPP. LTE is anticipated to become the first global mobile device standard. The LTE wireless interface is incompatible with 2G and 3G networks, and thus must operate on a separate wireless spectrum, referred to as 4G. As mentioned, LTE supports scalable carrier bandwidths from 1.4 MHz to 20 MHz and supports both frequency division duplexing (FDD) and time-division duplexing (TDD). System Architecture Evolution (SAE) is the core network architecture of 3GPP's LTE wireless communication standard. The main component of the SAE is the Evolved Packet Core (EPC), which is the equivalent of GPRS networks. The physical layer of LTE utilizes both orthogonal frequency division multiplex (OFDM) and multiple input multiple output (MIMO) technologies. The utilization of these technologies constitutes the major differentiation over 3G systems, which are based on CDMA.

Again, with reference to LTE, depending on the standard cell structure selected (for LTE, 1.4, 3, 5, 10, 15, or 20 MHz), resource blocks are allocated which actually transmit data between the wireless communications network 210 and the mobile device 202. The use of the term resource block throughout this disclosure is consistent with its use in this technology area. As such, as used herein, a resource block is a block of twelve (12) consecutive sub-carriers (along the vertical axis), or 180 kHz, for the duration of seven (7) time slots (along the horizontal axis). Each time slot is 0.5 ms. A resource element is the smallest defined unit of a resource block, and consists of one sub-carrier during one time slot. Each resource block consists of 84 resource elements (12 sub-carriers×7 time slots). Further, in one embodiment, the middle 6 resource blocks of each set of resource blocks in a particular standard cell structure are referred to herein as the master portion, or the master information block. The master information block contains synchronization signals and the broadcast information that is broadcast to mobile devices, etc. Typically, the resource blocks that comprise the master information block more or less remain the same, regardless of the bandwidth being utilized. Also, resource blocks on either side of the master information block may or may not be used, depending on the bandwidth needed. In embodiments of the present invention, sub-carriers may be zero padded. As used herein, a sub-carrier that is zero padded is not used to transmit data between the mobile device and the wireless communications network.

LTE employs inverse Fast Fourier transform (IFFT) and Fast Fourier transform (FFT) for transmission and reception of data over the subcarriers (15 KHz each). At the transmitter side, there is one to one mapping between IFFT input and the corresponding subcarrier. For example, the center most input of IFFT is always zero representing a DC or null subcarrier at the center of the standard cell structure. This DC carrier is used by mobile devices to determine the center of the carrier frequency. Similar to center most input of IFFT, other inputs of IFFT can also be supplied with zeros to make their corresponding subcarriers DC or null carrier. This method of inputting zeros to certain IFFT inputs is referred to herein as zero padding.

Table 1 below illustrates allocated resource blocks and sub-carriers for each standard cell structure supported by LTE. For example, for a 5 MHz bandwidth, there are 25 resource blocks and 300 occupied sub-carriers. While there are 300 occupied sub-carriers, there are 512 total sub-carrier slots, although all are not used.

TABLE 1

LTE Bandwidth and associated Resource Blocks and Sub-carriers

| | Channel Bandwidth [MHz] | | | | | |
|---|---|---|---|---|---|---|
| | 1.4 | 3 | 5 | 10 | 15 | 20 |
| Number of resource blocks (N_RB) | 5 | 15 | 25 | 50 | 75 | 100 |
| Number of occupied subcarriers | 72 | 180 | 300 | 600 | 900 | 1200 |
| IDFT(Tx)/DFT(Rx) size | 128 | 256 | 512 | 1024 | 1536 | 2048 |

Other components not shown here may also be used to carry out aspects of the present invention. Further, several components shown in FIG. 2 may be combined into a single component although shown separately in FIG. 2. Generally, in this disclosure, when we speak of communicating data or information we are referring to any action that requires mobile device 202 to have an IP address in order to carry out some action. Mobile device 202 might attempt to access items such as the Internet as well as other components that might alone or in combination facilitate things such as television reception, e-mail reception, picture mail, video mail, video conferencing, and the like.

Figure 3:
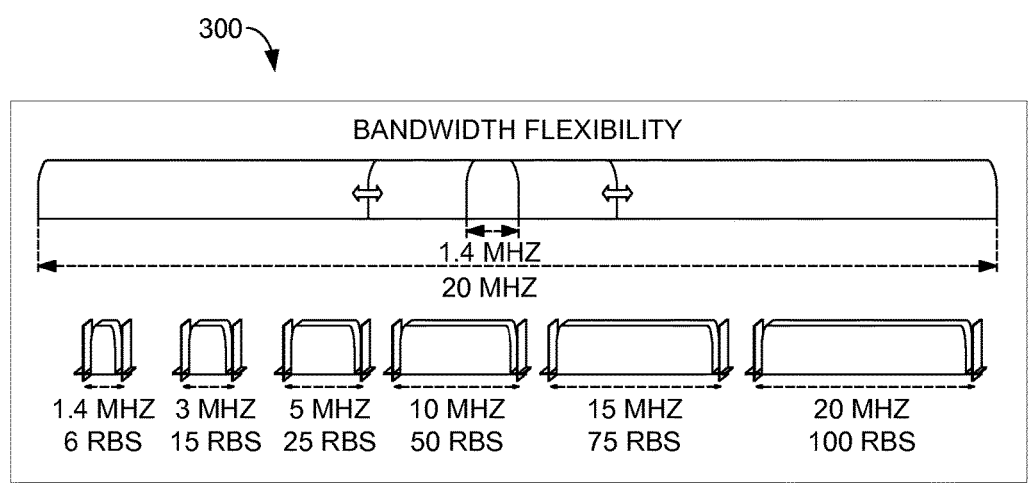
FIG. 3 depicts a diagram illustrating bandwidth flexibility, in accordance with an embodiment of the present invention.

Turning now to FIG. 3, a diagram 300 is depicted illustrating bandwidth flexibility, in accordance with an embodiment of the present invention. For instance, the size of a 1.4 MHz bandwidth is compared to the size of a 20 MHz bandwidth. As such, the figure illustrates that more data can be transmitted using a 10 MHz bandwidth than a 1.4 MHz bandwidth, as the channel is wider. The figure also illustrates the differences in size between the various standard cell structures supported by LTE, and the number of resource blocks allocated to each standard cell structure.

Figure 4:
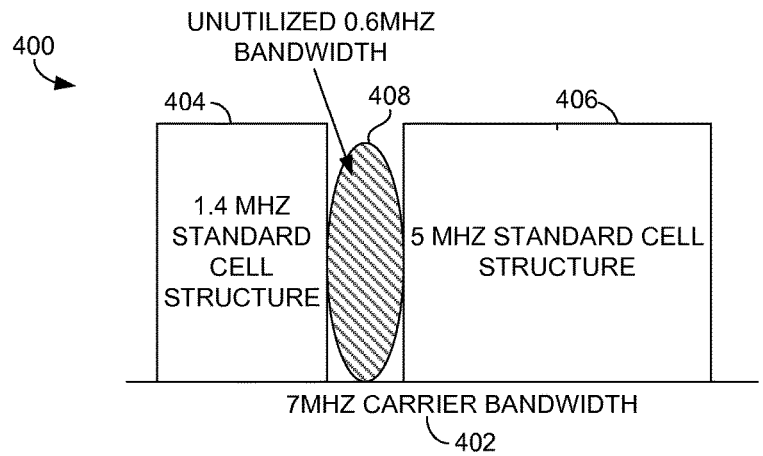
FIG. 4 depicts a diagram illustrating the utilization of multiple standard cell structures.

Referring to FIG. 4, the diagram 400 illustrates the utilization of multiple standard cell structures. Without using embodiments of the present invention, one or more standard cell structures may be used simultaneously. For example, when a 1.4 MHz standard cell structure 404 and a 5 MHz standard cell structure 406 are used together, the used bandwidth is 6.4 MHz. However, if the carrier bandwidth is 7 MHz 402, for example, there is 0.6 MHz of unutilized bandwidth 408, as illustrated in FIG. 4.

Figure 5:
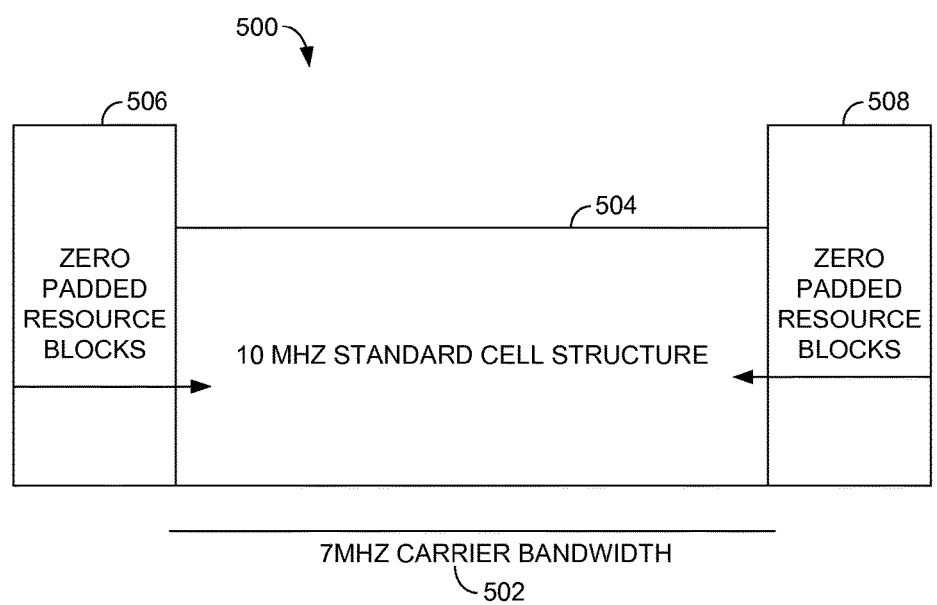
FIG. 5 depicts a diagram illustrating the utilization of a single standard cell structure with zero padding, in accordance with an embodiment of the present invention.

FIG. 5 depicts a diagram 500 illustrating the utilization of a single standard cell structure with zero padding, in accordance with an embodiment of the present invention. Here, instead of selecting one or more standard cell structures that, even when combined, result in unutilized bandwidth, a standard cell structure is selected that is larger than the carrier bandwidth. Thus, here, a 10 MHz standard cell structure 504 has been selected, such as by the base station, to be used by a carrier that runs on or that owns a 7 MHz bandwidth 502. But, portions of the standard cell structure have been zero padded, including zero padded portions 506 and 508. In one embodiment, the portions that are zero padded are entire resource blocks, and as such, a portion of a resource block is not zero padded, but instead the entire resource block is padded, and may be padded in increments of entire resource blocks (e.g., one resource block is padded, two resource blocks are padded, five resource blocks are padded). The portion of the standard cell structure that is zero padded, or that will not be used to transmit data, will depend on how the base station or other network device determines the bandwidth resource is best allocated. For instance, in one embodiment, the resource blocks on the very outer edge of the standard cell structure may be zero padded, leaving a large, contiguous chunk of utilized bandwidth in the middle. But in an alternate embodiment, there may be multiple chunks of bandwidth that are noncontiguous that are utilized to transmit data. In this embodiment, the portions of the standard cell structure that are zero padded are not simply the resource blocks on the far ends of the standard cell structure, but may be moved in toward the center of the standard cell structure. As represented by the arrows in FIG. 5, the zero padded portions may be anywhere, other than the resource blocks that comprise the master information block (e.g., the middle six resource blocks). As such, this would leave spectrum chunks used to communicate data (e.g., not zero padded) that are noncontiguous.

Figure 6:
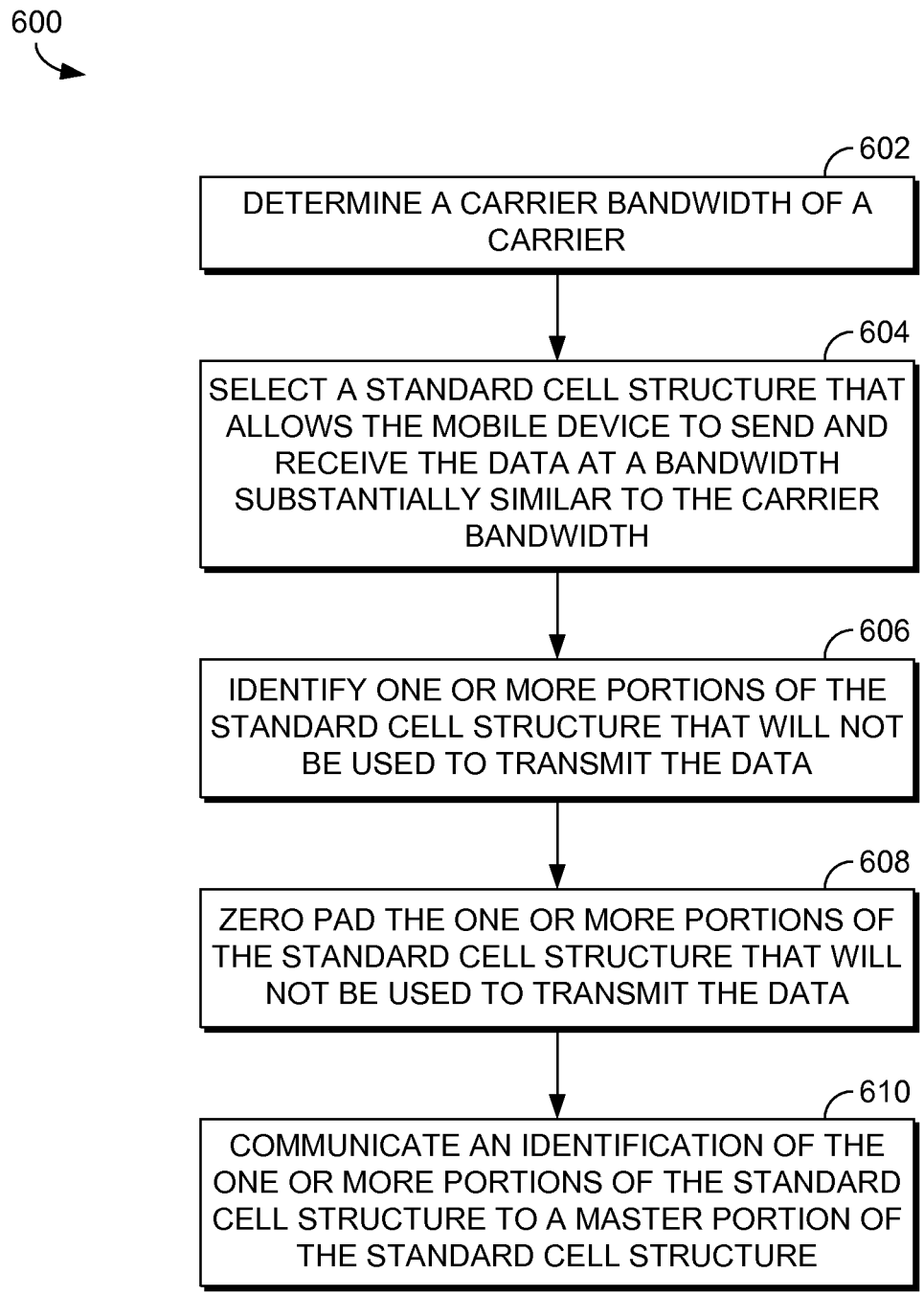
FIGS. 6-7 depict flowcharts illustrating methods for maximizing bandwidth utilization in a wireless communications network, in accordance with embodiments of the present invention.

Turning now to FIG. 6, a flowchart is depicted illustrating a method 600 for maximizing bandwidth utilization in a wireless communications network, in accordance with an embodiment of the present invention. Initially, at step 602, a carrier bandwidth of a carrier associated with the mobile device is determined. The carrier bandwidth, in one embodiment, is spectrum available to or owned by the carrier, but in another embodiment, is bandwidth associated with a particular technology used to communicate data. For instance, the mobile device attempting to communicate data may be associated with carrier A. Carrier A has a specific amount of bandwidth that it owns and that is available to it, and thus a component, such as the base station (e.g., eNodeB) determines this bandwidth. At step 604, a standard cell structure is selected that allows the mobile device to send and receive data at a bandwidth substantially similar to the carrier bandwidth. The standard cell structure may be identified based on one or more of the carrier bandwidth and spectrum available to or owned by the carrier. In one embodiment, the standard cell structure is capable of operating at a larger bandwidth than the standard carrier bandwidth, but is operated at a lower capacity.

At step 606, one or more portions of the standard cell structure that will not be used to transmit data are identified. At step 608, these portions of the standard cell structure are zero padded. As previously described, zero padding basically nulls out an individual sub-carrier, and thus is done by setting the input value to 0. In one embodiment, one contiguous portion of the standard cell structure may be used to transmit the data (e.g., not zero padded) but in an alternate embodiment, there are two or more portions of the standard cell structure that are used to transmit the data, and thus that are not zero padded. In the instance of multiple portions, these portions are continuous, but in an alternate embodiment, these portions are noncontiguous, and thus are separated by one or more portions (e.g., resource blocks) that are not used to transmit data, and thus that are zero padded. At step 610, an identification of the portions of the bandwidth channel that are zero padded is communicated to a master portion of the standard cell structure. In one instance, the master portion includes parameters for initial access to the standard cell structure. The master portion, in one embodiment, is the master information block when LTE technology is used by the carrier. In that embodiment, the master information block comprises the innermost or centermost six resource blocks.

In one embodiment, the steps as identified in FIG. 6 are used in an LTE-based wireless communications network, but in an alternate embodiment, the steps are used in a non-LTE-based wireless communications network.

Figure 7:
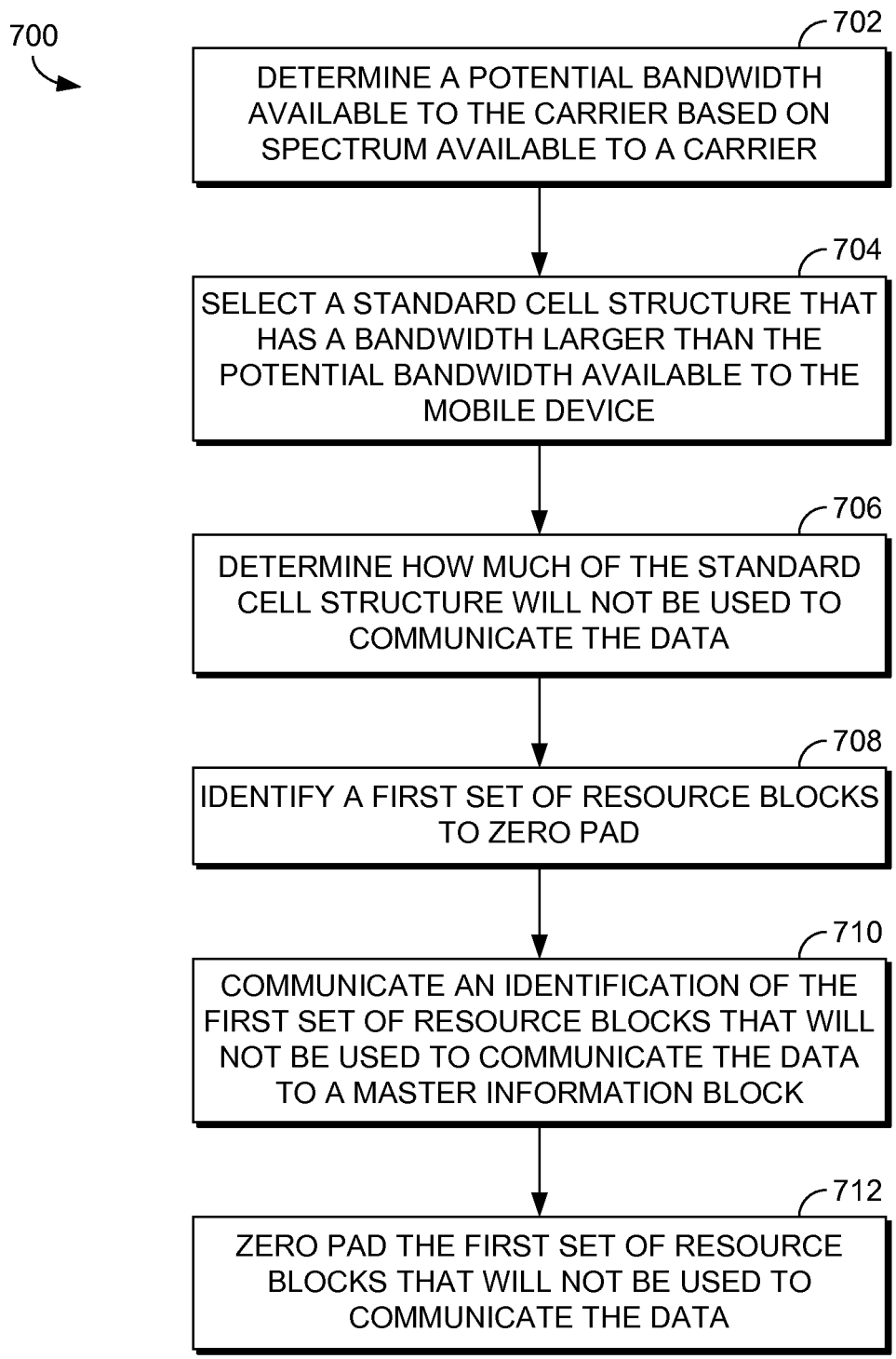

Referring to FIG. 7, a flowchart is depicted illustrating a method 700 for maximizing bandwidth utilization in a wireless communications network, in accordance with an embodiment of the present invention. Initially at step 702, a potential bandwidth available to the carrier is determined based, at least, on spectrum available to the carrier associated with the mobile device. The potential bandwidth may be determined upon receiving a request from the mobile device to communicate data in a wireless communications network, such as an LTE-based wireless communications network. At step 704, a standard cell structure is selected that is larger than the potential bandwidth available to the mobile device. In one embodiment, a base station (e.g., eNodeB) selects the standard cell structure as it allocates system resources. As shown in reference to FIG. 5, the 10 MHz standard cell structure 504 was selected, as it is larger than the 7 MHz carrier bandwidth 502. As such, the standard cell structure selected is capable of operating at a larger bandwidth than the carrier bandwidth. This allows for all or a majority of the carrier bandwidth to be utilized. For an LTE-based wireless communications network, available standard cell structures may include 1.4, 3, 5, 10, 15, or 20 MHz.

At step 706, it is determined how much bandwidth of the selected standard cell structure will not be used to communicate data. As mentioned, entire resource blocks may be unutilized so that the utilized portion of the standard cell structure is substantially similar, or at least very close to the carrier bandwidth. This allows all or most of the carrier bandwidth to be utilized, thus allowing for larger amounts of data to be transmitted to and from the mobile device at any one time. At step 708, a first set of resource blocks is identified that will be zero padded. Stated differently, the resource blocks that comprise the first set of resource blocks have been determined to not be needed to communicate data to and from the mobile device. This first set of resource blocks is identified based on the bandwidth that will not be used to communicate data, as determined at step 706.

An identification of the first set of resource blocks that will not be used to communicate data is communicated to a master information block that transmits this information to the mobile device, shown at step 710. In one embodiment, the master information block broadcasts out this information, and thus makes it available to the mobile device. At step 712, the first set of resource blocks is zero padded. Further, the zero padding of the first set of resource blocks results in a second set of resource blocks that will be used to communicate data. In one embodiment, the resource blocks in the second set of resource blocks are noncontiguous, and thus results in multiple chunks of one or more resource blocks that are used to communicate data. Zero padding of the first set of resource blocks, in one embodiment, indicates that no data is to be transmitted by way of resource elements that comprise each resource block in the first set of resource blocks.

In an additional embodiment, an indication is received that a mobile device is attempting to communicate data by way of an LTE-based wireless communications network. A bandwidth requirement is determined of a carrier associated with the mobile device. Based on the bandwidth requirement, a standard cell structure is selected that is capable of operating at a larger bandwidth than the bandwidth requirement of the carrier such that the mobile device can send and receive the data at a bandwidth substantially similar to the available bandwidth of the carrier. Further, one or more resource blocks of the standard cell structure that will not be used to transmit data are identified. These resource blocks that will not be used to transmit data may be contiguous, or may be noncontiguous. These resource blocks are zero padded. An identification of these resource blocks that will not be used to communicate data is communicated to the master information block, which includes parameters for initial access to the standard cell structure. The master information block broadcasts the identification of the one or more noncontiguous resource blocks to the mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:
1. A computerized method carried out by at least one server having one or more processors for performing a method of maximizing bandwidth utilization in a wireless communications network, the method comprising:

determining a carrier bandwidth of a carrier associated with a mobile device that is requesting to communicate data by way of the wireless communications network;

based on the carrier bandwidth, selecting a standard cell structure that allows the mobile device to send and receive the data at a bandwidth equal to or larger than the carrier bandwidth;

identifying one or more portions of the standard cell structure that will not be used to transmit the data associated with the request to communicate the data; and prior to communicating the data, maximizing bandwidth utilization by inputting zeroes into the one or more portions of the standard cell structure that will not be used to transmit the data.

2. The method of claim 1, further comprising communicating an identification of the one or more portions of the standard cell structure to the mobile device through a master portion of the standard cell structure.

3. The method of claim 1, wherein the wireless communications network is an LTE-based network.

4. The method of claim 1, wherein inputting the zeroes into the one or more portions of the standard cell structure that will not be used to transmit the data results in two or more portions of the standard cell structure that are used to transmit the data.

5. The method of claim 4, wherein the two or more portions of the standard cell structure used to transmit the data are contiguous.

6. The method of claim 4, wherein the two or more portions of the standard cell structure used to transmit the data are noncontiguous.

7. The method of claim 1, wherein the selected standard cell structure has a bandwidth that is larger than the carrier bandwidth.

8. The method of claim 1, further comprising determining spectrum available to the carrier.

9. The method of claim 8, wherein the selected standard cell structure is larger than the spectrum available to the carrier.

10. A system for maximizing bandwidth utilization in a wireless communications network, the system comprising:
a base station in a wireless communications network adapted to:
determine a potential bandwidth available to a carrier associated with a mobile device requesting data,
select a standard cell structure that is larger than the potential bandwidth available to the carrier,
determine how much bandwidth of the selected standard cell structure that will not be used to communicate the data,
identify a first set of resource blocks that will not be used to communicate the data,
identify a second set of resource blocks that will be used to communicate the data, and
maximizing bandwidth utilization by inputting zeroes into the first set of resource blocks that will not be used to communicate the data.

11. The system of claim 10, wherein the base station is further adapted to communicate an identification of the first set of resource blocks that will not be used to communicate the data through a master information block to the mobile device.

12. The system of claim 10, wherein the inputting of zeroes into the first set of resource blocks indicates that no data is transmitted by way of resource elements that comprise each resource block in the first set of resource blocks.

13. A computer-implemented method of maximizing bandwidth utilization in a wireless communications network, the method comprising:
receiving an indication that a mobile device is requesting to communicate data by way of a wireless communications network;
determining a carrier bandwidth corresponding to a carrier that is associated with the mobile device;
based on the carrier bandwidth, selecting a standard cell structure that operates at a bandwidth larger than the operator bandwidth to maximize bandwidth utilization of the carrier;
at a base station, identifying one or more resource blocks of the standard cell structure that will not be used to transmit the data associated with the communication of the data; and
prior to communicating the data by way of the standard cell structure, maximizing bandwidth utilization by inputting zeroes into the one or more resource blocks of the standard cell structure that will not be used to transmit the data.

14. The method of claim 13, wherein the wireless communications network is an LTE-based wireless communications network that utilizes LTE or LTE-advanced.

15. The method of claim 13, further comprising communicating an identification of the one or more resource blocks of the standard cell structure to the mobile device though a master information block of the standard cell structure, wherein the master information block includes parameters for initial access to the standard cell structure.

16. The method of claim 15, wherein the master information block comprises six resource blocks.

17. The method of claim 16, wherein the six resource blocks that comprise the master information block are in a center of the standard cell structure.

18. The method of claim 13, wherein the base station selects the standard cell structure.

* * * * *